(12) United States Patent
Kim et al.

(10) Patent No.: US 12,341,198 B2
(45) Date of Patent: Jun. 24, 2025

(54) BINDER COMPOSITION OF SECONDARY BATTERY AND LITHIUM SECONDARY BATTERY INCLUDING THE SAME

(71) Applicant: SK ON CO., LTD., Seoul (KR)

(72) Inventors: Jeong A Kim, Daejeon (KR); Byoung Ho Ko, Daejeon (KR)

(73) Assignee: SK On Co., Ltd., Seoul (KR)

(*) Notice: Subject to any disclaimer, the term of this patent is extended or adjusted under 35 U.S.C. 154(b) by 521 days.

(21) Appl. No.: 17/725,035

(22) Filed: Apr. 20, 2022

(65) Prior Publication Data
US 2022/0359880 A1  Nov. 10, 2022

(30) Foreign Application Priority Data
Apr. 21, 2021 (KR) .................. 10-2021-0051571

(51) Int. Cl.
*H01M 4/62* (2006.01)
*H01M 10/0525* (2010.01)

(52) U.S. Cl.
CPC ....... *H01M 4/623* (2013.01); *H01M 10/0525* (2013.01)

(58) Field of Classification Search
CPC ....... H01M 10/0525; H01M 2004/028; H01M 4/623; Y02E 60/10
See application file for complete search history.

(56) References Cited

U.S. PATENT DOCUMENTS

| 10,089,743 B1 | 10/2018 | Kim et al. | |
| 2018/0366728 A1* | 12/2018 | Kaga | H01M 4/364 |

FOREIGN PATENT DOCUMENTS

| JP | 2005123047 A | 5/2005 |
| JP | 201397906 A | 5/2013 |
| JP | 2013097906 A | 5/2013 |
| JP | 2013156139 A | 8/2013 |
| KR | 1020050100461 A | 10/2005 |
| KR | 1020150100461 A | 9/2015 |
| KR | 1020160035631 A | 4/2016 |
| KR | 1020190039647 A | 4/2019 |
| KR | 1020190096281 A | 8/2019 |
| KR | 1020190140819 A | 12/2019 |

OTHER PUBLICATIONS

Machine translation JP2005123047A (Year: 2005).*
Machine translation KR20190140819A (Year: 2019).*

* cited by examiner

*Primary Examiner* — Victoria H Lynch
(74) *Attorney, Agent, or Firm* — The Webb Law Firm

(57) ABSTRACT

A binder composition for a secondary battery includes an elastic resin that includes a hard segment containing at least one of a urethane unit and a urea unit, and a soft segment containing a polyether unit, and a fluorine-based hydrocarbon resin. A weight ratio of the fluorine-based hydrocarbon resin relative to the elastic resin is in a range from 1.0 to 1.5.

14 Claims, 1 Drawing Sheet

BINDER COMPOSITION OF SECONDARY BATTERY AND LITHIUM SECONDARY BATTERY INCLUDING THE SAME

CROSS-REFERENCE TO RELATED APPLICATION

This application claims priority to Korean Patent Application No. 10-2021-0051571 filed Apr. 21, 2021, the disclosure of which is hereby incorporated by reference in its entirety.

BACKGROUND OF THE INVENTION

1. Field of the Invention

The present invention relates to a binder composition for a secondary battery and a lithium secondary battery including the same. More particularly, the present invention relates to a binder composition for a secondary battery including different types of polymers and a lithium secondary battery including the same.

2. Description of the Related Art

A secondary battery which can be charged and discharged repeatedly has been widely employed as a power source of a mobile electronic device such as a camcorder, a mobile phone, a laptop computer, etc.

For example, the secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, an electrode (a cathode and an anode) of the lithium secondary battery may include an electrode current collector and an electrode active material layer formed on the electrode current collector.

For example, the electrode active material layer may include an electrode active material capable of intercalating and de-intercalating lithium ions. The electrode active material layer may further include a binder for providing an adhesion between the electrode current collector and the electrode active material and for providing a binding between the electrode active material particles.

For example, polyvinylidene fluoride (PVDF) is widely known as the binder. However, PVDF has a weak adhesion to the electrode current collector. If a content of the binder is increased to improve the adhesion, a battery capacity may be decreased. is lowered.

For example, Japanese Laid-Open Patent Publication No. 2005-123047 disclose that PVDF is used together with a hydrogenated acrylonitrile-butadiene rubber.

SUMMARY OF THE INVENTION

According to an aspect of the present invention, there is provided a binder composition for a secondary battery capable of having an improved adhesion and providing a low electrode resistance.

According to an aspect of the present invention, there is provided a lithium secondary battery having improved charge/discharge stability.

A binder composition for a secondary battery according to embodiments of the present invention includes an elastic resin that includes a hard segment containing at least one of a urethane unit and a urea unit, and a soft segment containing a polyether unit, and a fluorine-based hydrocarbon resin. A weight ratio of the fluorine-based hydrocarbon resin relative to the elastic resin is in a range from 1.0 to 1.5.

In some embodiments, a content of the hard segment in the elastic resin may be in a range from 10 wt % to 45 wt % based on a total weight of the elastic resin.

In some embodiments, the hard segment may include at least one of an aromatic urethane unit and an aromatic urea unit.

In some embodiments, the hard segment may include both the urethane unit and the urea unit.

In some embodiments, a molar ratio of the urea unit relative to the urethane unit in the hard segment may be in a range from 0.5 to 1.0.

In some embodiments, the polyether unit may be derived from a polyether polyol.

In some embodiments, a weight average molecular weight of the polyether polyol may be in a range from 1,000 g/mol to 3,000 g/mol.

In some embodiments, the polyether polyol may include at least one selected from the group consisting of polyethylene glycol, polytetramethylene ether glycol, polypropylene glycol and an ethylene-propylene glycol copolymer.

In some embodiments, a weight average molecular weight of the elastic resin may be in a range from 300,000 g/mol to 1,000,000 g/mol.

In some embodiments, a density of the elastic resin may be in a range from of 1.0 $g/cm^3$ to 1.3 $g/cm^3$.

In some embodiments, a Mooney viscosity of the elastic resin may be in a range from 45 to 60.

In some embodiments, the elastic resin may have a tensile strength in a range from 240 $kg/cm^2$ to 450 $kg/cm^2$, and an elongation in a range from 450% to 800%.

In some embodiments, the fluorine-based hydrocarbon resin may include at least one selected from the group consisting of polyvinylidene fluoride, a vinylidene fluoride-hexafluoropropylene copolymer and a vinylidene fluoride-chlorotrifluoroethylene copolymer.

A lithium secondary battery according to embodiments of the present invention includes a cathode including a cathode active material and the binder composition according to embodiments as described above, and an anode facing the cathode.

A low electrode resistance with increased adhesion may be implemented by using the binder composition for a secondary battery according to exemplary embodiments as described above. Thus, power and charging/discharging rate of the secondary battery may be improved.

Desorption of an electrode active material and a change ratio of an electrode thickness during charging and discharging may be suppressed in the secondary battery according to exemplary embodiments, thereby preventing deterioration of the electrode. Thus, life-span properties of the secondary battery may also be improved.

DESCRIPTION OF THE INVENTION

<Binder Composition>

Figure 1:
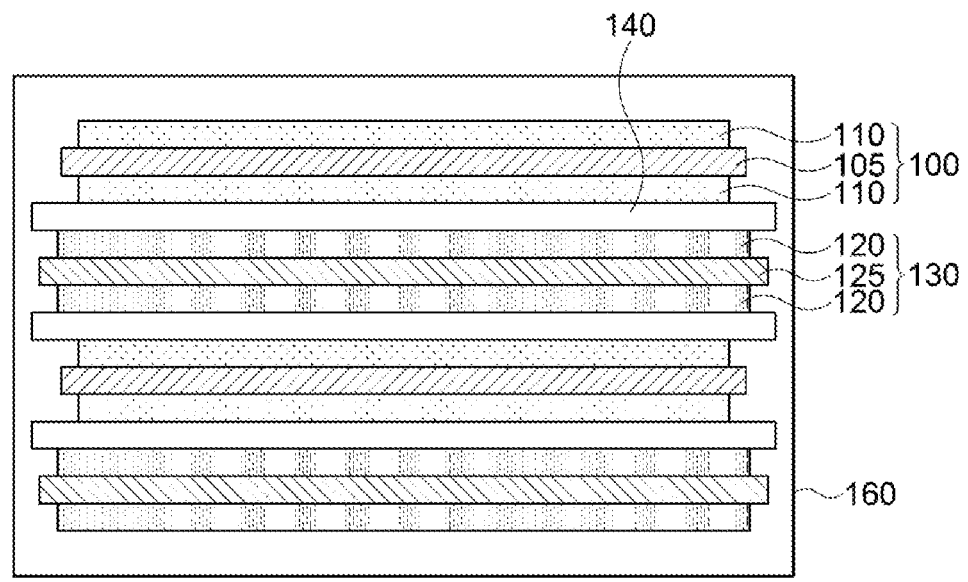
FIGS. 1 and 2 are a schematic cross-sectional view and a top planar view, respectively, illustrating a secondary battery in accordance with exemplary embodiments.

A binder composition according to exemplary embodiments as described in detail below may be used as a binder for an electrode (e.g., a cathode) of a secondary battery.

The binder composition according to exemplary embodiments may provide an increased electrode adhesion (an adhesion between an electrode current collector and an electrode active material, and an adhesion between the electrode active materials), thereby preventing the electrode active material from being detached during charging and discharging. Accordingly, an electrode deterioration due to repeated charging and discharging may be prevented, and a secondary battery having enhanced life-span may be achieved. Further, a low electrode resistance may also be achieved.

The binder composition according to exemplary embodiments may include an elastic resin and a fluorine-based hydrocarbon resin. For example, the elastic resin may include polyurethane, polyurea or polyurethane-urea.

In an embodiment, a weight ratio of the fluorine-based hydrocarbon resin relative to the elastic resin may be in a range from 1.0 to 1.5 in the binder composition. If the weight ratio is not within the range above, an electrode adhesion and an electrode resistance may be degraded. Further, a change ratio of an electrode thickness during repeated charging and discharging of the secondary battery may be increased.

In an embodiment, the elastic resin may include a hard segment and a soft segment.

In an embodiment, the hard segment may include at least one of a urethane unit and a urea unit. Additionally, the soft segment may include a polyether unit. In this case, the electrode adhesion may be improved, and the change ratio of the electrode thickness occurring during the repeated charging and discharging may be reduced or buffered.

For example, the urethane unit may be derived from a —OH group of a polyol (e.g., a diol) and an isocyanate group (—NCO) of a diisocyanate. For example, the urea unit may be derived from a —NH$_2$ group of a polyamine (e.g., a diamine) and an isocyanate group (—NCO) of a diisocyanate.

For example, the urethane unit may also be derived from a —OH group of a chain extender (e.g., an aliphatic diol) and an isocyanate group of a diisocyanate. For example, the urea unit may be derived from the —NH$_2$ group of a chain extender (e.g., aliphatic diamine) and an isocyanate group of a diisocyanate.

In an embodiment, the hard segment may include at least one of an aromatic urethane unit and an aromatic urea unit. In this case, the electrode adhesion may be further improved.

The aromatic urethane unit may refer to a urethane unit including an aromatic ring structure in a molecular structure thereof. The aromatic urea unit may refer to a urea unit including an aromatic ring structure in a molecular structure thereof.

For example, the aromatic urethane unit may be derived from an —OH group of a polyol and an isocyanate group (—NCO) of an aromatic diisocyanate (e.g., methylene diphenyl diisocyanate; MDI). The aromatic urea unit may be derived from a —NH$_2$ group of a polyamine (e.g., diamine) and an isocyanate group (—NCO) of an aromatic diisocyanate. As described above, the aromatic urethane unit and the aromatic urea unit may also be derived from the aromatic diisocyanate and a chain extender.

In an embodiment, the hard segment may include both the urethane unit and the urea unit. In this case, the electrode adhesion may be further improved, and the change ratio of the electrode thickness during the repeated charging and discharging of the secondary battery may be further reduced.

In some embodiments, the elastic resin may include polyurethane-urea represented by Chemical Formula 1 below.

[Chemical Formula 1]

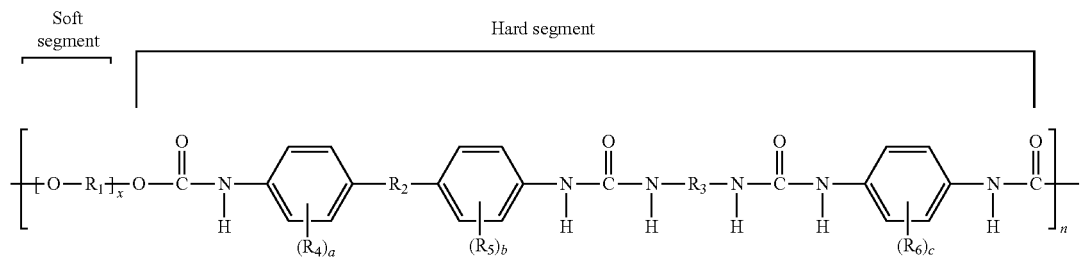

In Chemical Formula 1, $R_1$ may be a C1-C6 alkylene group, $R_2$ and $R_3$ may each independently be a direct bond or a C1-C6 alkylene group, $R_4$ to $R_6$ may each independently be a halogen or a C1-C3 alkyl group, and a, b and c may each independently be an integer of 0 to 4. When a, b and c are each an integer of 2 to 4, $R_4$ groups may be the same or different from each other, $R_5$ groups may be the same or different from each other, and $R_6$ groups may be the same or different from each other In Chemical Formula 1, x may be an integer from 20 to 40, and n may be an integer from 10 to 700. The alkylene group and the alkyl group may be linear or branched.

In some embodiments, $R_1$ may be a methylene group or an ethylene group.

In some embodiments, $R_2$ may be a methylene group or an ethylene group.

In some embodiments, $R_3$ may be a direct bond, a methylene group or an ethylene group.

In some embodiments, a, b and c may each be 0 (zero).

In some embodiments, x may be from 25 and 35.

In some embodiments, n may be from 250 and 400.

In some embodiments, a molar ratio of the urea unit relative to the urethane unit in the hard segment may be from 0.5 to 1.0. Preferably, the molar ratio may be 1.0. In this case, the electrode adhesion may be further improved, and the change ratio of the electrode thickness during the repeated charging and discharging of the secondary battery may be further reduced.

In an embodiment, the polyether unit of the soft segment may be derived from a polyether polyol.

In some embodiments, the polyether polyol may have a weight average molecular weight (Mw) in a range from 1,000 g/mol to 3,000 g/mol. Preferably, the polyether polyol may have a weight average molecular weight in a range from 1,500 g/mol to 2000 g/mol. In this case, the change ratio of the electrode thickness during the repeated charging and discharging of the secondary battery may be further reduced.

In some embodiments, the polyether polyol may include at least one selected from the group consisting of polyethylene glycol, polytetramethylene ether glycol, polypropylene glycol and ethylene-propylene glycol copolymer.

In an embodiment, a content of the hard segment in the elastic resin may be in a range from 10 wt % to 45 wt %, preferably from 20 wt % to 40 wt %, more preferably from 25 wt % to 35 wt % based on a total weight of the elastic resin. The soft segment may be included in a remainder amount. In this case, the electrode adhesion may be further improved, and the change ratio of the electrode thickness during the repeated charging and discharging of the secondary battery may be further reduced.

For example, if the content of the hard segment in the elastic resin exceeds 45 wt %, the electrode adhesion may be decreased. If the content of the hard segment in the elastic resin is less than 20 wt %, the change ratio of the electrode thickness during the repeated charging and discharging of the secondary battery may be increased.

In an embodiment, a weight average molecular weight (Mw) of the elastic resin may be in a range from 300,000 g/mol to 1,000,000 g/mol, preferably 500,000 g/mol to 700,000 g/mol.

In an embodiment, a Mooney viscosity of the elastic resin may be in a range from 45 to 60. In this case, a dispersive property in an electrode slurry may be enhanced, so that the elastic resin may be uniformly distributed in the electrode active material layer. Accordingly, detachment of the electrode active material due to the repeated charging and discharging of the secondary battery may be further prevented. The Mooney viscosity of the elastic resin may be measured based on, e.g., a standard of ASTM D1646.

In an embodiment, a density of the elastic resin may be in a range from 1.0 g/mol to 1.3 g/mol. The density of the elastic resin may be measured based on, e.g., a standard of ASTM D1505.

In an embodiment, a tensile strength of the elastic resin may be in a range from 100 kg/cm$^2$ to 450 kg/cm$^2$, preferably from 240 kg/cm$^2$ to 400 kg/cm$^2$. The tensile strength of the elastic resin may be measured based on, e.g., a standard of ASTM D412.

In one embodiment, an elongation of the elastic resin may be in a range from 100% to 800%, preferably from 200% to 800%, more preferably 450% to 800%. The elongation of the elastic resin may be measured based on, e.g., a standard of ASTM D412.

The fluorine-based hydrocarbon resin may refer to, e.g., a hydrocarbon resin obtained by polymerizing an olefin containing fluorine. The fluorine-based hydrocarbon resin may also refer to a hydrocarbon resin in which hydrogen of the hydrocarbon resin is substituted with fluorine.

For example, the fluorine-based hydrocarbon resin may include at least one selected from the group consisting of polyvinylidene fluoride, vinylidene fluoride-hexafluoropropylene copolymer and vinylidene fluoride-chlorotrifluoroethylene copolymer.

<Lithium Secondary Battery>

Figure 2:
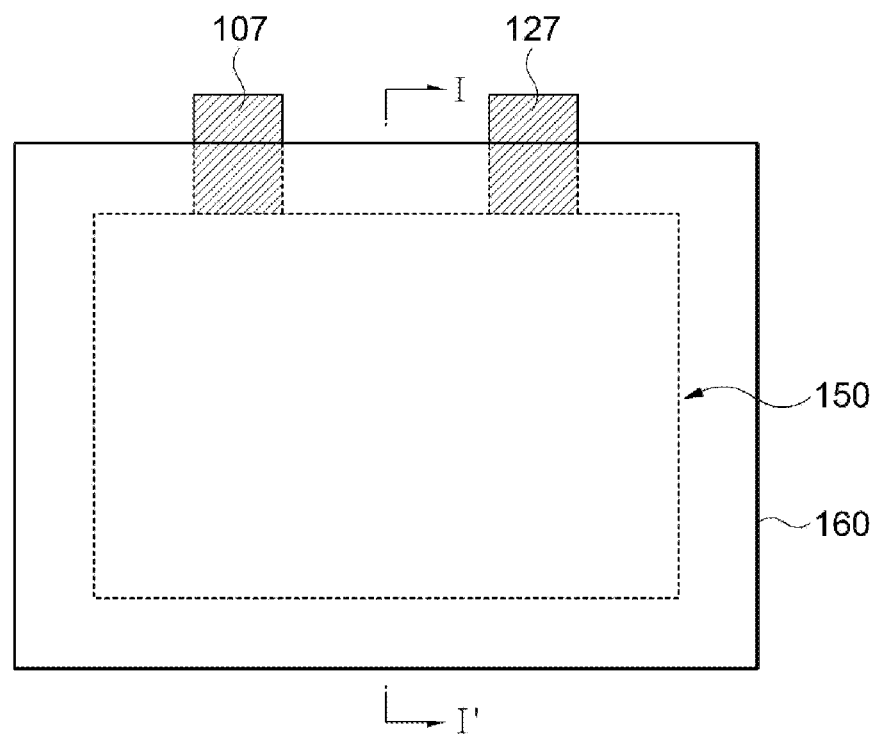

FIGS. 1 and 2 are a schematic cross-sectional view and a top planar view, respectively, illustrating a secondary battery in accordance with exemplary embodiments. For example, FIG. 1 is a cross-sectional view taken along a line I-I' of FIG. 2 in a thickness direction.

Referring to FIGS. 1 and 2, the lithium secondary battery may include a cathode 100 and an anode 130 facing the cathode 100. A separation layer 140 may be interposed between the cathode 100 and the anode 130.

The cathode 100 may include a cathode current collector 105 and a cathode active material layer 110 on the cathode current collector 105.

The cathode active material layer 110 may include a cathode active material, a cathode binder, and may further include a conductive material.

For example, a cathode slurry may be prepared by mixing and stirring the cathode active material, the cathode binder, the conductive material, a dispersive agent, etc., and then the cathode slurry may be coated on the cathode current collector 105, dried and pressed to form the cathode 100.

The cathode current collector 105 may include, e.g., stainless steel, nickel, aluminum, titanium, copper or an alloy thereof, and may include preferably aluminum or an aluminum alloy.

The cathode active material may include a material capable of reversibly intercalating and de-intercalating lithium ions. The cathode active material may include be, e.g., a lithium metal oxide including a metal element such as nickel, cobalt, manganese, aluminum, etc.

In some embodiments, the lithium metal oxide may be represented by Chemical Formula 2 below.

  [Chemical Formula 2]

$$Li_xNi_aCo_bM_cO_y$$

In Chemical Formula 2, M may be at least one of Al, Zr, Ti, B, Mg, Mn, Ba, Si, Y, W, and Sr, $0.9 \leq x \leq 1.1$, $1.9 \leq y \leq 2.1$, $0.8 \leq a \leq 1$, $0 \leq c/(a+b) \leq 0.13$ and $0 \leq c \leq 0.11$.

In some embodiments, the lithium metal oxide may further include a coating element or a doping element. For example, the coating element or the doping element may include Al, Ti, Ba, Zr, Si, B, Mg, P, Sr, W, La, an alloy thereof, or an oxide thereof. These may be used alone or in a combination thereof.

The binder composition according to the above-described exemplary embodiments may be used as the cathode binder.

For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 on the anode current collector 125.

The anode active material layer 120 may include an anode active material and an anode binder, and may further include a conductive material.

For example, the anode active material, the anode binder, the conductive material, a solvent, etc., may be mixed and stirred to prepare an anode. The anode slurry may be coated on the anode current collector 125, dried and pressed to obtain the anode 130.

The anode current collector 125 may include, e.g., gold, stainless steel, nickel, aluminum, titanium, copper or an alloy thereof, and may include, preferably, copper or a copper alloy.

The anode active material may be a material capable of intercalating and de-intercalating lithium ions. The anode active material may include, e.g., a carbon-based material such as a crystalline carbon, an amorphous carbon, a carbon composite material or a carbon fiber; a silicone-based material; a lithium alloy, etc.

The amorphous carbon may include, e.g., hard carbon, cokes, mesocarbon microbead (MCMB) calcined at 1500° C. or less, mesophase pitch-based carbon fiber (MPCF), etc.

The crystalline carbon may include, e.g., natural graphite, graphitized cokes, graphitized MCMB, graphitized MPCF, or the like.

The silicon-based material may include, e.g., Si, SiOx (0<x<2), Si/C, SiO/C or a Si-Metal.

The lithium alloy may include, e.g., a metal element such as aluminum, zinc, bismuth, cadmium, antimony, silicon, lead, tin, gallium or indium.

The anode binder may include, e.g., an aqueous binder such as styrene-butadiene rubber (SBR) for compatibility with the carbon-based active material, and may be used together with a thickener such as carboxymethyl cellulose (CMC).

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation to further improve power and capacity of the secondary battery.

The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

An electrode cell may be formed including the anode 100, the cathode 130 and the separator 140. A plurality of the electrode cells may be stacked to form an electrode assembly 150. For example, the electrode assembly 150 may be formed by winding, lamination or z-folding of the separation layer 140.

The electrode assembly 150 may be accommodated together with an electrolyte in the case 160 to define a lithium secondary battery.

The lithium secondary battery may include a cathode lead 107 connected to the cathode 100 to protrude to an outside of the case 160, and an anode lead 127 connected to the anode 130 to protrude to the outside of the case 160

For example, the cathode lead 107 may be electrically connected to the cathode current collector 105. The anode lead 130 may be electrically connected to the anode current collector 125.

For example, the cathode current collector 105 may include a protrusion (cathode tab, not illustrated) at one side thereof. The cathode active material layer 110 may not be formed on the cathode tab. The cathode tab may be integral with the cathode current collector 105 or may be connected with the cathode current collector 105 by, e.g., welding. The cathode current collector 105 and the cathode lead 107 may be electrically connected to each other via the cathode tab.

The anode current collector 125 may include a protrusion (anode tab, not illustrated) at one side thereof. The anode active material layer 120 may not be formed on the anode tab. The anode tab may be integral with the anode current collector 125 or may be connected with the anode current collector 125 by, e.g., welding. The anode current collector 125 and the anode lead 127 may be electrically connected to each other via the anode tab.

In an embodiment, the electrode assembly 150 may include a plurality of cathodes and a plurality of anodes. For example, a plurality of cathodes and anodes may be alternately stacked, and the separation layer may be interposed between the cathode and the anode. The lithium secondary battery may include a plurality of cathode tabs and a plurality of anode tabs protruding from each of the plurality of cathodes and the plurality of anodes.

In an embodiment, the cathode tabs (or anode tabs) may be laminated, compressed and/or welded to form a cathode tab stack (or anode tab stack). The cathode tab stack may be electrically connected to the cathode lead 107. The anode tab stack may be electrically connected to the anode lead 127.

The electrolyte may include, e.g., a lithium salt, and the lithium salt may be accommodated in the case in a non-aqueous electrolyte state together with an organic solvent.

The lithium salt may be, e.g., represented as $Li^+X^-$.

An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc. In some embodiments, the lithium salt may include at least one of $LiBF_4$ and $LiPF_6$.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

The lithium secondary battery may be manufactured in, e.g., a cylindrical shape, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of Binder Composition

A polyurethane urea (PUU) having a structure of Chemical Formula 3 below and having 24 wt % of a hard segment was prepared.

[Formula 3]

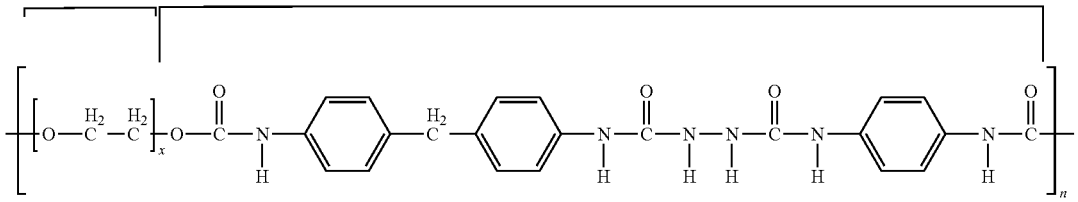

The polyurethane urea and polyvinylidene fluoride (PVDF) were mixed in a weight ratio of 5:5 to prepare a binder composition.

(2) Fabrication of Cathode

A cathode slurry was prepared by mixing $LiNi_{0.8}Co_{0.1}Mn_{0.1}O_2$ as a cathode active material, a carbon black conductive material, and the binder composition as prepared above in a weight ratio of 92:5:3.

The cathode slurry was uniformly coated on a region of an aluminum foil (thickness: 15 μm) excluding a protrusion (a cathode tab) formed at one side of the aluminum foil, and then dried and pressed to prepare a cathode.

(3) Fabrication of Secondary Battery

An anode active material including artificial graphite and natural graphite mixed in a weight ratio of 7:3, a styrene-butadiene rubber (SBR) binder and a carboxymethyl cellulose (CMC) thickener were mixed in a weight ratio of 97:1:2 to prepare an anode slurry.

The anode slurry was uniformly coated on a region of a copper foil (thickness: 15 μm) excluding a protrusion (an anode tab) formed at one side of the copper foil, and then dried and pressed to prepare an anode.

A polyethylene separator (thickness: 20 μm) was interposed between the cathode and the anode to form an electrode assembly. Thereafter, a cathode lead and an anode lead were welded and connected to the cathode tab and the anode tab, respectively.

The electrode assembly was accommodated in a pouch (case) such that portions of the cathode lead and the anode lead were exposed to an outside, and three sides of the pouch except for an electrolyte injection side were sealed.

An electrolyte was injected through the electrolyte injection side, and then electrolyte injection side was also sealed. Thereafter, a lithium secondary battery sample was prepared by performing an impregnation for 12 hours.

As the electrolyte, a 1M $LiPF_6$ solution (in a mixed solvent of EC/EMC/DEC with a volume ratio of 25:30:45) was prepared, and 1 wt % of FEC (fluoroethylene carbonate), 0.3 wt % of VC (vinylethylene carbonate), 1.0 wt % of $LiPO_2F_2$ (lithium difluorophosphate), 0.5 wt % of PS (1,3-propane sultone) and 0.5 wt % of PRS (prop-1-ene-1,3-sultone) were added and mixed.

Example 2

A lithium secondary battery was fabricated by the same method as that of Example 1, except that a weight ratio of the polyurethane urea and PVDF was changed to 4:6 in the binder composition.

Examples 3 to 6

A degree of polymerization (x) of the soft segment was controlled to prepare polyurethane ureas having different contents of the hard segment.

Lithium secondary batteries were fabricated by the same method as that of Example 1, except that the contents of the hard segment were 27 wt % (Example 3), 30 wt % (Example 4), 34 wt % (Example 5) and 39 wt % (Example 6).

Comparative Example 1

A lithium secondary battery was fabricated by the same method as that of Example 1, except that PVDF was only used as a binder.

Comparative Examples 2 to 4

Lithium secondary batteries were fabricated by the same method as that of Example 1, except that the polyurethane urea and PVDF were mixed in a weight ratio of 2:8 (Comparative Example 2), 6:4 (Comparative Example 3) and 8:2 (Comparative Example 4) in the binder composition.

Comparative Example 5

Lithium secondary batteries were fabricated by the same method as that of Example 1, except that the polyurethane urea was only used as a binder.

Experimental Example (1) Evaluation on Electrode Adhesive Force

The cathode of Examples and Comparative Examples were cut into a size of 2.5 cm (width) and 15 cm (length) to prepare samples. An adhesive force was evaluated by performing a peel-off test using the samples and a 90 degree adhesive force meter (UTM).

(2) Evaluation of Change in Electrode Thickness

The initial thickness (T1) of each cathode of Examples and Comparative Examples was measured.

CC/CV charging (0.5 C 4.3V 0.05 C CUT-OFF) and CC discharging (1.0 C 3.0V CUT) were performed at room temperature (25° C.) for the secondary batteries of Examples and Comparative Examples were repeated 50 times.

Thereafter, the charged secondary battery was disassembled, and a thickness (T2) of the cathode was measured. The thickness was measured using an electronic micrometer (range: 0-25.4 mm, accuracy: 0.001 mm).

A change ratio of the cathode thickness was calculated using a formula below.

Change ratio of cathode thickness (%)=$T2-T1/T1 \times 100(\%)$ (3) Evaluation on Electrode Resistance An electrode resistance (Ω cm) was measured for each cathode of Examples and Comparative Examples.

The measurement equipment was hioki XF057 Probe unit, and measurement conditions were 100 uA current, 0.5V voltage range and 40 pin contacts.

The results are shown in Table 1 below.

TABLE 1

| | PUU:PVDF | hard segment content (wt %) | electrode adhesive force (N) | change ratio of electrode thickness (%) | electrode resistance (Ohm*cm) |
|---|---|---|---|---|---|
| Example 1 | 5:5 | 24 | 1.39 | 3.1 | 15.58 |
| Example 2 | 4:6 | 24 | 1.36 | 3.3 | 15.14 |
| Example 3 | 5:5 | 27 | 1.41 | 2.9 | 15.22 |
| Example 4 | 5:5 | 30 | 1.43 | 2.8 | 15.31 |
| Example 5 | 5:5 | 34 | 1.44 | 2.8 | 15.28 |
| Example 6 | 5:5 | 39 | 1.38 | 3.4 | 15.47 |
| Comparative Example 1 | 0:10 | — | 0.78 | 3.9 | 13.69 |

TABLE 1-continued

| | PUU:PVDF | hard segment content (wt %) | electrode adhesive force (N) | change ratio of electrode thickness (%) | electrode resistance (Ohm*cm) |
|---|---|---|---|---|---|
| Comparative Example 2 | 2:8 | 24 | 1.05 | 3.7 | 13.46 |
| Comparative Example 3 | 6:4 | 24 | 1.48 | 4.0 | 23.84 |
| Comparative Example 4 | 8:2 | 24 | 1.31 | 3.7 | 28.28 |
| Comparative Example 5 | 10:0 | 24 | <0.05 (detachment) | 19.6 | 36.66 |

Referring to Table 1, in the cathode of Examples, high electrode adhesive force and low increasing ratio of the electrode thickness were provided while maintaining proper electrode resistance.

In the cathodes of Comparative Examples 1 and 2, the electrode adhesive force was decreased, and the increasing ratio of the electrode thickness exceeded 3.5%. In this case, desorption of the electrode active material and deterioration of the electrode may occur during repeated charging and discharging of the secondary battery, and a capacity retention property of the secondary battery may be degraded.

In the cathodes of Comparative Examples 3 and 4, the increasing ratio of the electrode thickness was increased, and the electrode resistance was excessively increased to be improper in a practical use.

In the cathode of Comparative Example 5, detachment occurred in the electrode adhesion evaluation, and inferior results were provided also in other evaluations.

What is claimed is:

1. A binder composition for a secondary battery, comprising:
   an elastic resin that comprises a hard segment containing at least one of a urethane unit or a urea unit, and a soft segment containing a polyether unit; and
   a fluorine-based hydrocarbon resin,
   wherein a weight ratio of the fluorine-based hydrocarbon resin relative to the elastic resin is in a range from 1.0 to 1.5.

2. The binder composition for a secondary battery of claim 1, wherein a content of the hard segment in the elastic resin is in a range from 10 wt % to 45 wt % based on a total weight of the elastic resin.

3. The binder composition for a secondary battery of claim 1, wherein the hard segment comprises at least one of an aromatic urethane unit or an aromatic urea unit.

4. The binder composition for a secondary battery of claim 1, wherein the hard segment comprises both the urethane unit and the urea unit.

5. The binder composition for a secondary battery of claim 4, wherein a molar ratio of the urea unit relative to the urethane unit in the hard segment is in a range from 0.5 to 1.0.

6. The binder composition for a secondary battery of claim 1, wherein the polyether unit is derived from a polyether polyol.

7. The binder composition for a secondary battery of claim 6, wherein a weight average molecular weight of the polyether polyol is in a range from 1,000 g/mol to 3,000 g/mol.

8. The binder composition for a secondary battery of claim 6, wherein the polyether polyol comprises at least one selected from the group consisting of polyethylene glycol, polytetramethylene ether glycol, polypropylene glycol and an ethylene-propylene glycol copolymer.

9. The binder composition for a secondary battery of claim 1, wherein a weight average molecular weight of the elastic resin is in a range from 300,000 g/mol to 1,000,000 g/mol.

10. The binder composition for a secondary battery of claim 1, wherein a density of the elastic resin is in a range from of 1.0 g/cm$^3$ to 1.3 g/cm$^3$.

11. The binder composition for a secondary battery of claim 1, wherein a Mooney viscosity of the elastic resin is in a range from 45 to 60.

12. The binder composition for a secondary battery of claim 1, wherein the elastic resin has a tensile strength in a range from 240 kg/cm$^2$ to 450 kg/cm$^2$, and an elongation in a range from 450% to 800%.

13. The binder composition for a secondary battery of claim 1, wherein the fluorine-based hydrocarbon resin comprises at least one selected from the group consisting of polyvinylidene fluoride, a vinylidene fluoride-hexafluoropropylene copolymer and a vinylidene fluoride-chlorotrifluoroethylene copolymer.

14. A lithium secondary battery, comprising:
   a cathode comprising a cathode active material and the binder composition of claim 1; and
   an anode facing the cathode.

* * * * *

UNITED STATES PATENT AND TRADEMARK OFFICE
CERTIFICATE OF CORRECTION

| | | |
|---|---|---|
| PATENT NO. | : 12,341,198 B2 | Page 1 of 1 |
| APPLICATION NO. | : 17/725035 | |
| DATED | : June 24, 2025 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this
Sixteenth Day of December, 2025

John A. Squires
*Director of the United States Patent and Trademark Office*